United States Patent

McCown

[11] Patent Number: 5,253,535
[45] Date of Patent: Oct. 19, 1993

[54] APPARATUS AND METHOD FOR MONITORING MASS FLOW OF SOLIDS

[75] Inventor: William J. McCown, Gulfport, Miss.

[73] Assignee: E. I. Du Pont de Nemours and Company, Wilington, Del.

[21] Appl. No.: 801,920

[22] Filed: Dec. 3, 1991

[51] Int. Cl.$^5$ .............................................. G01F 1/86
[52] U.S. Cl. ........................................ 73/861; 73/217; 73/218; 250/356.1; 250/434; 250/435
[58] Field of Search ................ 73/861, 861.02, 861.03, 73/861.79, 861.87, 861.88, 217, 218; 250/356.1, 356.2, 434

[56] References Cited

U.S. PATENT DOCUMENTS

| | | | |
|---|---|---|---|
| 1,579,280 | 4/1926 | Coleman | 73/861.79 |
| 2,654,246 | 10/1953 | Pfan | 73/217 |
| 2,896,084 | 7/1959 | MacDonald | 250/356.1 |
| 4,238,956 | 12/1980 | Sniezek et al. | 73/861.01 |
| 4,520,677 | 6/1985 | Macko et al. | 73/861 |

Primary Examiner—Michael T. Razavi
Assistant Examiner—T. May
Attorney, Agent, or Firm—David J. Gould

[57] ABSTRACT

A method and apparatus for transporting solid particulate material and calculating mass flow rate of the material through a rotary feeder having helical pockets is provided. At least one radiation source and two or more detectors are positioned in a manner whereby radiation flux is directed through, and attenuated by particulate material contained in a helical pocket. The amount of attenuation is measured at least when the pocket is filled with material and when the pocket has discharged most of the material. The difference in the amount of flux detected at the filled and discharged positions is used to determine the mass flow rate of the particulate material.

6 Claims, 1 Drawing Sheet

APPARATUS AND METHOD FOR MONITORING MASS FLOW OF SOLIDS

BACKGROUND OF THE INVENTION

1. Field of the Invention

The invention relates to an apparatus and method for monitoring the mass flow rate of particulate solids, particularly, titanium dioxide.

2. Description of the Prior Art

In many chemical processes which include transporting particulate solids, it is important to continuously or intermittently monitor the solids' mass flow rate in order to properly maintain the process controls needed to obtain satisfactory product.

For example, during finish processing of titanium dioxide pigment, an accurate measurement of the mass flow rate of the titanium dioxide improves significantly the quality of the finished product.

Techniques presently used to determine mass flow include utilization of a rotary feeder system having a predetermined rate of rotation and inferring the mass flow rate from the rate of rotation. There are several problems with this technique, all of which result in inaccurate mass flow rate determinations. Although the volume of the feeder pockets is known, the pockets are not uniformly filled. Also, particle size, moisture content and other variables affect the mass transfer rate for a given revolution rate. Additionally, fine materials tend to be retained for a period of time within the feeder pockets and the surrounding casing as a result of pressure differentials.

U.S. Pat. No. 4,520,677 discloses a method and apparatus for indicating mass flow of a solid particulate material through a star wheel rotary feeder. Such feeders include a plurality of vanes extending radially from a rotating shaft, mounted within a housing, to form a plurality of rotating pockets which receive, transport through the housing, and subsequently discharge solid particulate material. The apparatus utilizes a source for discharging a radiation flux positioned within the rotating shaft. The radiation flux is discharged toward a detector, through the shaft and pockets containing the solid particulate material. By measuring the attenuation of the radiation flux at various points, e.g., when directed through a parallel vane, a filled pocket or a discharged pocket, a measurement of the mass can be calculated. However, this method loses accuracy because an estimated adjustment is needed to accommodate peaks in the radiation flux attenuation caused by the vanes being parallel in a star wheel rotary feeder.

It is therefore desirable to provide an apparatus and method for determining particulate solid mass flow rate which alleviate the discussed limitations. It is further desirable to provide an apparatus and system which is simple, reliable and which takes advantage of existing technology and components.

SUMMARY OF THE INVENTION

This invention provides an apparatus and method for calculating mass flow rate of solid particulate material through a rotary feeder.

The apparatus comprises a rotary feeder having a rotatable shaft mounted within a housing. The rotatable shaft has a plurality of vanes extending helically therefrom forming helical pockets which receive, transport and subsequently discharge solid particulate material. The housing contains a housing inlet for receiving the solid particulate material into the helical pockets and a housing outlet through which the solid particulate material is discharged from the helical pockets. The rotatable shaft is operationally connected to a means for rotating the rotatable shaft.

The apparatus further comprises a flux discharging radiation source disposed within the rotatable shaft, a first and second flux radiation detectors disposed externally of the housing, means for measuring the flux radiation received by the detectors and converting the measurements to electrical signals for transmitting, means for measuring rate of rotation of the rotatable shaft and converting the measurement to an electrical signal for transmitting; a means for calculating mass flow rate of particulate solid material based on the signals received from the means for measuring the flux radiation received by the detectors and the means for measuring rate of rotation; and a means for displaying the calculated mass flow rate.

The first detector is disposed downstream of the housing inlet and upstream of the housing outlet, i.e., where the pocket is filled with solid particulate material. The second detector is disposed downstream of the housing outlet and upstream of the housing inlet, i.e., where the pocket has discharged the solid particulate material.

In the method, a known amount of flux radiation is discharged from the source toward the first and second detectors. The flux radiation therefore passes through each pocket twice during rotation, once in the filled position and again in the discharged position. The amount of flux radiation received at the first and second detectors is measured. The rate of rotation of the shaft and helical pockets is measured. The measurements are converted to electrical signals and are transmitted to the means for calculating the mass flow rate.

The use of a rotary feeder with helical pockets allows a constant amount of the housing and rotating shaft with its helical vanes to be in the detectors' view path. Since the attenuation of the flux radiation due to the housing, shaft and vanes is constant, the difference between the signal of the radiation received by the first detector and the signal of the radiation received by the second detector is due to the mass of discharged solid particulate material. Therefore the means for calculating the mass flow rate can accurately determine the actual mass discharged. The method uses the accurate mass determination and the measurement of rotation of the shaft to calculate an accurate mass flow rate which is then displayed.

BRIEF DESCRIPTION OF THE DRAWINGS

The advantages, nature and additional features of the invention will become more apparent from the following description, taken in connection with the accompanying drawings, in which.

DETAILED DESCRIPTION OF THE PREFERRED EMBODIMENTS

Figure 1:
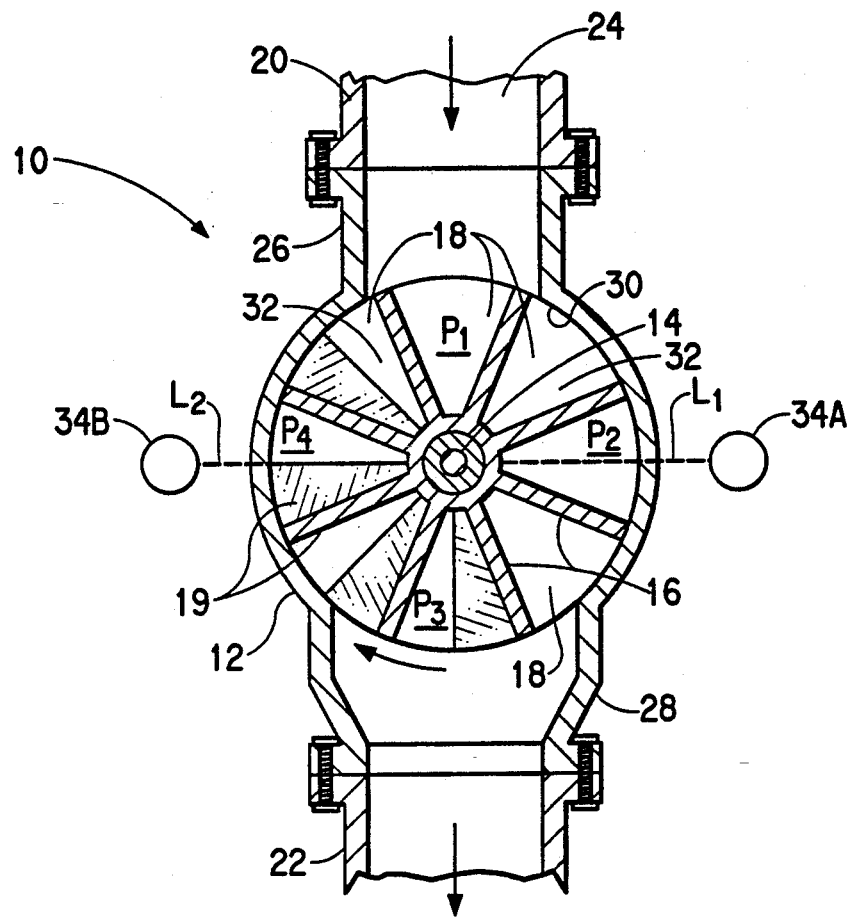
FIG. 1 is a side elevation, in section, of an apparatus of the invention.
Figure 2:
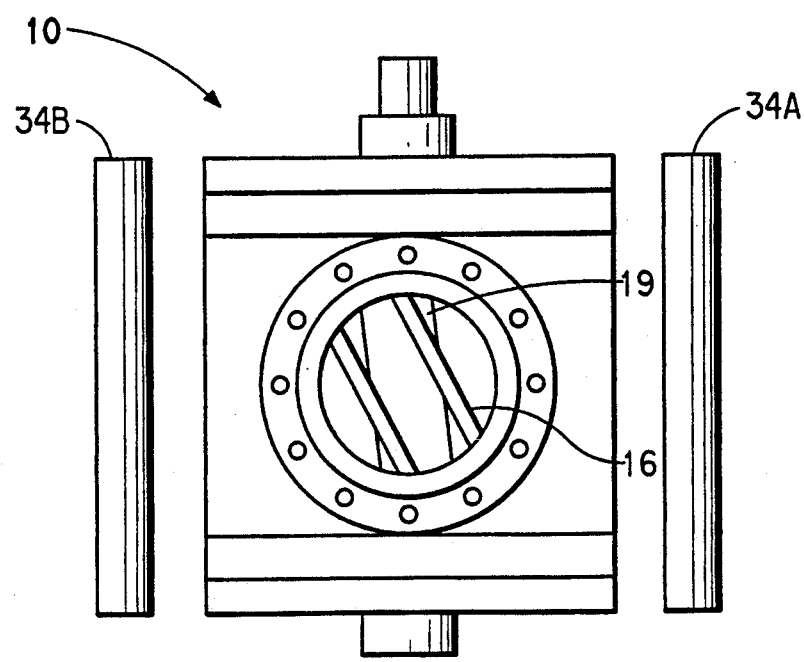
FIG. 2 is a top view of the device of FIG. 1.

Referring now to FIGS. 1 through 2, there is shown an exemplary rotary feeder 10 in accordance with the invention. The feeder 10 includes a housing 12 within which is mounted a rotatable shaft 14. Helically extending from the shaft are a plurality of vanes 16 which form within the housing a plurality of helical pockets 18. The helical pockets 18 are bounded laterally by side walls 19 of the vanes.

The housing is generally affixed to an inlet conduit 20 and an outlet conduit 22 through which flow a solid particulate material 24 such as titanium dioxide. The particulate material 24 does not consistently display free flowing characteristics.

The housing 12 has a housing inlet 26 for receiving solid particulate material 24 into the helical pockets 18 and a housing outlet 28 through which the solid particulate material 24 is discharged from the helical pockets 18.

The shaft 14 is rotated by a rotating means, not shown, thereby rotating the vanes 16 and helical pockets 18 to transport solid particulate material 24 from the housing inlet 24 to the housing outlet 28. Preferably, the rotating means is a motor coupled with a gear mechanism to enable the rate of rotation to be controlled by the operator.

The apparatus has a means, not shown, for measuring the rate of rotation of the shaft 14 and helical pockets 18. Preferably, the means is a tachometer.

With a clockwise rotational motion as shown in FIG. 1, solid particulate material 24 enters and substantially fills the helical pocket 18 at the position identified as P1, is carried through the housing and is discharged at position P3. At position P2, the helical pocket 18 is substantially filled, and its volume is readily defined between the shaft 14, the interior surface 30 of the housing 12, and the side wall 19 of the vane 16. A certain amount of the solid particulate material 24 often adheres within the helical pocket 18. Subsequent to the discharge of the bulk of the material within the pocket, the substantially empty pocket continues its rotation through position P4 and returns to position P1 to be refilled.

Means for discharging flux radiation, such as one or more gamma source(s) 32, are mounted within the rotatable shaft 14. The flux radiation is directed from the source 32 through the shaft 14, pockets 18 and vanes 16 and housing 12 to flux radiation detectors 34A and 34B.

Preferably, the flux radiation source is Cesium-137 which provides excellent penetration through the shaft 14, vanes 16 and housing 12 and through the solid particulate material 24. The amount of flux radiation and number of flux radiation sources required is established by analyzing parameters such as composition and thickness of the shaft 14, vanes 16, and housing 12, the density of the solid particulate material 24 and the span. Multiple flux radiation sources of differing strengths may be required to achieve a uniform flux radiation field intensity at the face of the detector. The determination of individual source strength, plurality and spacing between sources is application dependent and is largely governed by the physical dimensions of the feeder pocket width and separation between radioactive source and detector. For example, in a process utilizing a 14 inches, (35.56 cm), wide rotary feeder and $TiO_2$ particulate material, three radiation sources of 10, 5 and 10 milliCuries each (total of 25 milliCuries) are used to create a uniform field. The amount of flux radiation is held to a minimum to achieve optimum sensitivity, economy and safety. Radioisotopes other than Cesium-137 can also be used as the flux radiation source.

Preferably, the radiation source material is placed in a suitable holder surrounded with lead in all directions except where the radiation is collimated and beamed to detectors 34A and 34B. The lead effectively blocks radiation to a safe field intensity level which complies with applicable national and international standards.

The gamma rays, emitted from the radioisotope source 32, penetrates all materials. The energy of the gamma rays is reduced in proportion to the mass of the material through which it passes. The passage of gamma rays through a substance does not affect the substance's properties nor does the substance become radioactive.

The flux radiation is attenuated during passage to a degree which is a function of the mass of the shaft 14, vane 16 and housing 12, and the solid particulate material 24 contained within the helical pocket 18.

Positioned beyond the volume of the helical pocket 18 and external to the housing 12 are at least a first and second means for detecting and preferably, signalling radiation flux, such as gamma detectors 34A and 34B. The detectors, which are highly sensitive and stable, preferably consist of an ionization chamber and, more preferably, include a pre-amplifier. The detectors are mounted directly opposite a directed beam from the radiation source. The detectors extend the length of the pockets as does the collimated flux radiation.

As the flux passes from the source 32 to the detectors 34A and 34B, indicated by the dotted lines L1 and L2, it is attenuated by any material in its path. The detectors receive the attenuated collimated beam of flux radiation and generate an electrical signal, preferably a low impedance voltage signal, inversely proportional to the mass of the material through which the beam passed.

The electrical signal from the detectors 34A and 34B and the means for measuring the rate of rotation of the shaft, is provided to a means for calculating mass flow rate, not shown, which analyzes the signals. The calculating means is preferably a remote electronic monitor having a calculating and displaying means.

The detectors, means for measuring rotation and monitor are integrated to yield the quality of solid particulate material retained within a given pocket after discharge of the solid particulate material. The monitor compares the value of the signal received from the first detector at the filled position with the value of the signal received from the second detector at the discharged position to determine the mass of solid particulate material actually discharged from a given pocket. The difference between the determined mass contained in a given pocket in its full and discharged positions provides an accurate measure of the mass of solid particulate material discharged from the feeder. This determination takes into account the amount of material left in the pocket subsequent to discharge of most of the contained solids particulate material.

The mass determined is multiplied by the flow rate as measured by the means for measuring the rotation rate to provide the mass flow rate of the solid particulate material. The mass flow rate is preferably displayed on a digital readout.

Systems containing a flux radiation source, detectors and monitor are known to these skilled in the art and are commercially available. One example is the X91 Series Density Monitor sold by the Ronan Engineering Company, Measurements Division of Florence, Ky.

The inventors have found this apparatus and method to be of particularly advantage for use in measuring the transport of titanium dioxide which has a tendency to adhere to the pockets.

Since numerous changes may be made in the above-described apparatus and system without departing from the spirit and the scope of the disclosure, it is intended that the description be received as illustrative, and not in a limiting sense.

What is claimed is:

1. An apparatus for transporting solid particulate material and calculating mass flow rate of the material, the apparatus comprising:
   (a) a rotary feeder comprising
      i/ a rotatable shaft having a plurality of vanes extending helically therefrom so as to form helical pockets;
      ii/ a housing;
      iii/ a housing inlet for receiving solid particulate material into the helical pockets;
      iv/ a housing outlet for discharging solid particulate material from the helical pockets; and
      v/ means for rotating the rotatable shaft;
   (b) at least one flux discharging radiation source disposed within the rotatable shaft;
   (c) a first flux radiation detector disposed externally of the housing downstream of the housing inlet and upstream of the housing outlet;
   (d) a second flux radiation detector disposed externally of the housing downstream of the housing outlet and upstream of the housing inlet;
   (e) means for measuring and signaling the rate of rotation of the rotatable shaft;
   (f) means for measuring and signaling the amount of flux radiation transmitted through the helical pockets to the first and second detectors;
   (g) means for calculating mass flow rate of the solid particulate material from a specific helical pocket by correlating the signals of rate of rotation, and signals of flux radiation received by the first and second detectors; and
   (h) means for displaying mass flow rate.

2. The apparatus of claim 1 wherein the at least one flux discharging radiation source is a gamma radiation source.

3. The apparatus of claim 1 wherein the means of measuring the rate of rotation of the feeder is a gear-driven tachometer.

4. The apparatus of claim 1 comprising:
   (a) a rotary feeder comprising;
      i/ a rotatable shaft having a plurality of vanes extending helically therefrom so as to form helical pockets;
      ii/ a housing;
      iii/ a housing inlet for receiving solid particulate material into the helical pockets;
      iv/ a housing outlet for discharging solid particulate material from the helical pockets; and
      v/ a motor coupled with a gear mechanism for rotating the rotatable shaft;
   (b) at least one gamma radiation discharging source disposed within the rotatable shaft;
   (c) a first gamma radiation detecting, measuring and electrically signaling device disposed externally of the housing downstream of the housing inlet and upstream of the housing outlet;
   (d) a second gamma radiation detecting, measuring and electrically signaling device disposed externally of the housing downstream of the housing outlet and upstream of the housing inlet;
   (e) a tachometer for measuring and electrically signaling the rate of rotation of the rotatable shaft; and
   (g) a monitor for calculating and displaying mass flow rate of the solid particulate material based on the signal from the tachometer and comparing the signals from the first and second detecting measuring and signaling devices.

5. A method for determining mass flow rate of a solid particulate material which comprises:
   a) transporting a solid particulate material through an apparatus comprising:
      i/ a rotating shaft having a plurality of vanes extending helically therefrom to form helical pockets;
      ii/ a housing;
      iii/ a housing inlet for receiving solid particulate material into the helical pockets;
      iv/ a housing outlet for discharging solid particulate material from the helical pockets;
      v/ a means for rotating the rotating shaft;
      vi/ at least one flux discharging radiation source disposed within the rotating shaft;
      vii/ a first flux radiation detector disposed externally of the housing downstream of the housing inlet and upstream of the housing outlet;
      viii/ a second flux radiation detector disposed externally of the housing downstream of the housing outlet and upstream of the housing inlet;
      ix/ a means for measuring rate of rotation of the rotating shaft and for converting the measurement to an electrical signal;
      x/ means for measuring the flux radiation transmitted through the helical pockets to the first and second detector and for converting the measurements to electrical signals;
      xi/ means for transmitting the electrical signals;
      xii/ means for receiving the electrical signals and calculating mass flow rate of the solid particulate material; and
      xiii/ a means for displaying mass flow rate;
   (b) discharging a known amount of flux radiation from the at least one flux radiation source toward the first and second flux radiation detectors;
   (c) measuring flux radiation received at the first and second flux radiation detectors for a given helical pocket;
   (d) converting the measurements received by the first and second detectors to electrical signals;
   (e) measuring rate of rotation of the rotating shaft and converting the measurement to an electrical signal:
   (f) transmitting the signals to the means for calculating the mass flow rate;
   (g) calculating mass flow rate by
      i/ determining mass of solid particulate material discharged from a given helical pocket by comparing the signal of the flux radiation received from the first detector to the signal of flux radiation received from the second detector;
      ii/ determining flow rate by using the signal from the means for measuring the rate of rotation; and
      iii/ multiplying the mass of solid particulate material discharged from the given helical pocket by the flow rate to provide a calculated mass flow rate; and
   (h) displaying the calculated mass flow rate.

6. A method according to claim 5, in which the solid particulate material is titanium dioxide.

* * * * *